(12) United States Patent
Holt et al.

(10) Patent No.: US 12,217,617 B2
(45) Date of Patent: Feb. 4, 2025

(54) AIRCRAFT EXCURSION REPORT

(71) Applicant: AIRBUS OPERATIONS LIMITED, Bristol (GB)

(72) Inventors: Matthew Holt, Bristol (GB); Simon Cameron, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 414 days.

(21) Appl. No.: 17/557,748

(22) Filed: Dec. 21, 2021

(65) Prior Publication Data

US 2022/0198948 A1 Jun. 23, 2022

(30) Foreign Application Priority Data

Dec. 22, 2020 (GB) ..................................... 2020377

(51) Int. Cl.
*G08G 5/06* (2006.01)
*B64D 45/00* (2006.01)
*G06V 20/17* (2022.01)

(52) U.S. Cl.
CPC ............... *G08G 5/06* (2013.01); *B64D 45/00* (2013.01); *G06V 20/17* (2022.01); *B64D 2045/0085* (2013.01)

(58) Field of Classification Search
None
See application file for complete search history.

(56) References Cited

U.S. PATENT DOCUMENTS

| 6,157,876 A | 12/2000 | Tarleton, Jr. et al. |
| 6,405,975 B1 | 6/2002 | Sankrithi et al. |
| 7,592,929 B2 | 9/2009 | Pepitone |
| (Continued) | | |

FOREIGN PATENT DOCUMENTS

CN 106611414 5/2017

OTHER PUBLICATIONS

Chenna et al. "Avoiding Runway and Taxiway Incursions and Excursions by Augmenting Autobrake System with Airport Lighting System, Markings and Signs." IP.com Prior Art Database Technical Disclosure, Oct. 31, 2019. (Year: 2019).*

(Continued)

*Primary Examiner* — Peter D Nolan
*Assistant Examiner* — Jacob Kent Besteman-Street
(74) *Attorney, Agent, or Firm* — Nixon & Vanderhye P.C.

(57) ABSTRACT

A computer-implemented method of obtaining an excursion report for an aircraft is disclosed. The aircraft includes one or more sensors and a vision system, and the method includes obtaining sensor data from the one or more sensors; storing and time-stamping the sensor data; operating the vision system to detect the aircraft leaving a runway or taxiway; recording a start time of an excursion period based on a time of detection of the aircraft leaving the runway or taxiway; operating the vision system to detect the aircraft returning to the runway or taxiway; recording an end time of the excursion period based on a time of detection of the aircraft returning to the runway or taxiway; and compiling an excursion report, the excursion report comprising: the start time of the excursion period, the end time of the excursion period and a subset of the sensor data which was time-stamped during the excursion period.

18 Claims, 5 Drawing Sheets

(56) References Cited

U.S. PATENT DOCUMENTS

| | | | |
|---|---|---|---|
| 7,623,044 | B2 | 11/2009 | Pepitone et al. |
| 2004/0056952 | A1 | 3/2004 | Konya |
| 2012/0123656 | A1 | 5/2012 | Radó et al. |
| 2016/0150195 | A1* | 5/2016 | Good .................. H04N 7/188 |
| | | | 348/143 |
| 2016/0292932 | A1* | 10/2016 | Gremmert ............ G08G 5/0013 |
| 2019/0347943 | A1 | 11/2019 | Pesik |
| 2020/0180781 | A1 | 6/2020 | McKeown et al. |
| 2020/0290750 | A1* | 9/2020 | Ferrell .................... G08G 5/06 |
| 2021/0024224 | A1* | 1/2021 | Mohan ................ G07C 5/0808 |
| 2021/0241638 | A1* | 8/2021 | Nitzan .................... G06F 17/00 |

OTHER PUBLICATIONS

Audrey Guilloton, et al., "State of the Art in Airport Navigation", DASC 2011, IEEE/AIAA 30$^{th}$ Digital Avionics Systems Conference, Oct. 2011, 12 pages.

Chris Kjelgaard, "Preventing incursions", FlightGlobal, Nov. 7, 2000, 6 pages, <https://www.flightglobal.com/preventing-incursions/34866.article=.

Claire Meymandi-Nejad, et al., "Lane detection and scene interpretation by particle filter in airport areas", 14$^{th}$ International Conference on Computer Vision Theory and Applications (VISAPP 2019), Feb. 2019, 9 pages.

Jose Molineros, et al., "Vision-based Augmented Reality for Pilot Guidance in Airport Runways and Taxiways", Proceedings of the Third IEEE and ACM International Symposium on Mixed and Augmented Reality (ISMAR 2004), Dec. 2004, 3 pages.

Kevin Theuma, et al., "An Image Processing Algorithm for Ground Navigation of Aircraft", Conference Paper, Apr. 2015, pp. 381-399.

Combined Search and Examination Report for GB Application No. 2020377.4 dated Jun. 18, 2021, 1 page.

Chenna et al. "Avoiding Runway and Taxiway Incursions and Excursions by Augmenting Autobrake System with Airport Lighting System, Markings and Signs", An IP.com Inc. Prior Art Database Technical Disclosure, pp. 1-10, Oct. 31, 2019.

Extended European Search Report for Application No. 21216293.7, 11 pages, dated May 19, 2022.

* cited by examiner

AIRCRAFT EXCURSION REPORT

CROSS RELATED APPLICATION

This application claims priority to United Kingdom Patent Application GB 2020377.4, filed Dec. 22, 2020, the entire contents of which is hereby incorporated by reference.

FIELD OF THE INVENTION

The present invention relates to a computer-implemented method of obtaining an excursion report for an aircraft, and an apparatus for obtaining an excursion report for an aircraft.

BACKGROUND OF THE INVENTION

An aircraft may experience numerous in-service events that require analysis to determine whether the aircraft requires additional services or maintenance as a result. One such event is when the aircraft departs the runway or taxiway whilst on the ground.

An excursion exposes an aircraft to loading not experienced during normal conditions, and so it is typical to inspect the aircraft to ensure that the landing gear in particular has not been affected by the excursion.

A runway or taxiway excursion is usually reported by the pilot. In the event of an excursion, the airline may download data from the aircraft covering the entire journey. Additional information can also be provided, such as the pilot report, as well as pictures and measurements from the excursion scene.

All this information is then pieced together to try to determine when the excursion occurred, the likely effects of the excursion, and if any damage is likely to have occurred that requires maintenance. This can be a long and arduous process, resulting in the aircraft being out of service for long periods.

A number of difficulties also arise in isolating the excursion data. Identifying the time and location of the excursion is not always easy and often relies heavily on the timing of the report lodged by the pilot, which may not occur until a significant time after the event. The excursion data is also extracted from existing sensors and imaging devices positioned on the aircraft that are used primarily for other purposes, and therefore their positions are typically not optimised to distinguish an excursion event from other events.

For example, the excursion data may include accelerometer data from accelerometers located close to the centre of the aircraft, rather than the landing gear, and therefore the data output by the accelerometers in the event of a gross aircraft movement (for example passing a taxiway threshold between the taxiway and runway) may be similar to the data output in the event that a landing gear drops into a pothole. Whilst an impact with debris during an excursion (or similar event such as the landing gear dropping into a pothole) may cause a sharp input to the landing gear that requires inspection, and possibly even maintenance, this sharp input does not necessarily register as a sharp output from the accelerometers. In some cases, the impact might be significant to a particular component of the aircraft (such as the landing gear) but appear otherwise insignificant when viewing the sensor data without hindsight knowledge of an excursion event.

It can be difficult to piece together all the different pieces of information (e.g. sensor data, post-event photographs, pilot's report) to create a coherent picture of the event. However, it is important to be able to isolate the excursion, as this allows the potential impact on the aircraft to be assessed.

SUMMARY OF THE INVENTION

A first aspect of the invention provides a computer-implemented method of obtaining an excursion report for an aircraft, the aircraft comprising one or more sensors and a vision system, the method comprising: obtaining sensor data from the one or more sensors; storing and time-stamping the sensor data; operating the vision system to detect an excursion of the aircraft from a runway or taxiway; recording a time of the excursion; and compiling an excursion report, the excursion report comprising: the time of the excursion, and a subset of the sensor data which was time-stamped during the excursion.

Operating the vision system to detect the excursion of the aircraft may comprise operating the vision system to detect the aircraft leaving the runway or taxiway.

Operating the vision system to detect the excursion of the aircraft may comprise operating the vision system to detect the aircraft leaving the runway or taxiway; and operating the vision system to detect the aircraft returning to the runway or taxiway.

The time of the excursion may comprise a time of detection of the aircraft leaving the runway or taxiway.

A second aspect of the invention provides a computer-implemented method of obtaining an excursion report for an aircraft, the aircraft comprising one or more sensors and a vision system, the method comprising: obtaining sensor data from the one or more sensors; storing and time-stamping the sensor data; operating the vision system to detect the aircraft leaving a runway or taxiway; recording a start time of an excursion period based on a time of detection of the aircraft leaving the runway or taxiway; operating the vision system to detect the aircraft returning to the runway or taxiway; recording an end time of the excursion period based on a time of detection of the aircraft returning to the runway or taxiway; and compiling an excursion report, the excursion report comprising: the start time of the excursion period, the end time of the excursion period and a subset of the sensor data which was time-stamped during the excursion period.

The first and second aspects of the invention allow the excursion data to be collected and correlated, thereby reducing any guesswork in correlating the various pieces of information needed to assess when an excursion took place and what the possible effects of an excursion may be. This reduces the manual labour required to analyse this information, and reduces the time in which an aircraft is out of service whilst any necessary checks are undertaken. The excursion report may be generated using existing systems of the aircraft, thereby reducing any modifications required to implement the method. The data can be in a set format, and this has the added benefit of also allowing downstream processes to become more efficient.

A third aspect of the invention provides an apparatus for obtaining an excursion report for an aircraft, the aircraft comprising one or more sensors and a vision system, wherein the apparatus is configured to perform the method of the first or second aspect.

A fourth aspect of the invention provides an aircraft comprising: one or more sensors; a vision system; and the apparatus of the third aspect.

Optionally, the excursion report is compiled after the sensor data has been obtained, stored and time-stamped; and compiling the excursion report comprises identifying the subset of the sensor data based on its time-stamps.

Optionally, the method further comprises: obtaining image data from the vision system; and storing and time-stamping the image data, wherein the excursion report further comprises a subset of the image data which was time-stamped during the excursion or during the excursion period.

Optionally, operating the vision system comprises: obtaining image data; processing the image data to detect an edge of the runway or taxiway by detecting one or more of: edge markings of the runway or taxiway; edge lighting of the runway or taxiway; and a centreline of the runway or taxiway.

Optionally, the sensor data is indicative of: acceleration of the aircraft, speed of the aircraft, a heading of the aircraft, a location of the aircraft, a quantity of fuel of the aircraft, a mass of the aircraft, a distribution of the mass of the aircraft, one or more engine parameters, a wheel speed, a brake pressure, and/or a centre of gravity of the aircraft.

Optionally, the method further comprises analysing the excursion report to determine a severity level of an excursion of the aircraft, and comparing the severity level to a predetermined severity threshold; wherein the excursion report is compiled in response to the severity level exceeding the predetermined severity threshold.

Optionally, the vision system comprises one or more imaging devices selected from: a visible light camera, an infrared camera, and a light detection and ranging system (LIDAR).

Optionally, the excursion report further comprises: a second subset of the sensor data which was time-stamped during a first time period of predetermined duration before the excursion period; and a third subset of the sensor data which was time-stamped during a second time period of predetermined duration after the excursion period.

Optionally, the aircraft comprises a landing gear; operating the vision system to detect the aircraft leaving the runway or taxiway comprises detecting the landing gear leaving the runway or taxiway; and operating the vision system to detect the aircraft returning to the runway or taxiway comprises detecting the landing gear returning to the runway or taxiway.

Optionally, the method further comprises generating an alert signal in response to the detection of the aircraft leaving the runway or taxiway.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
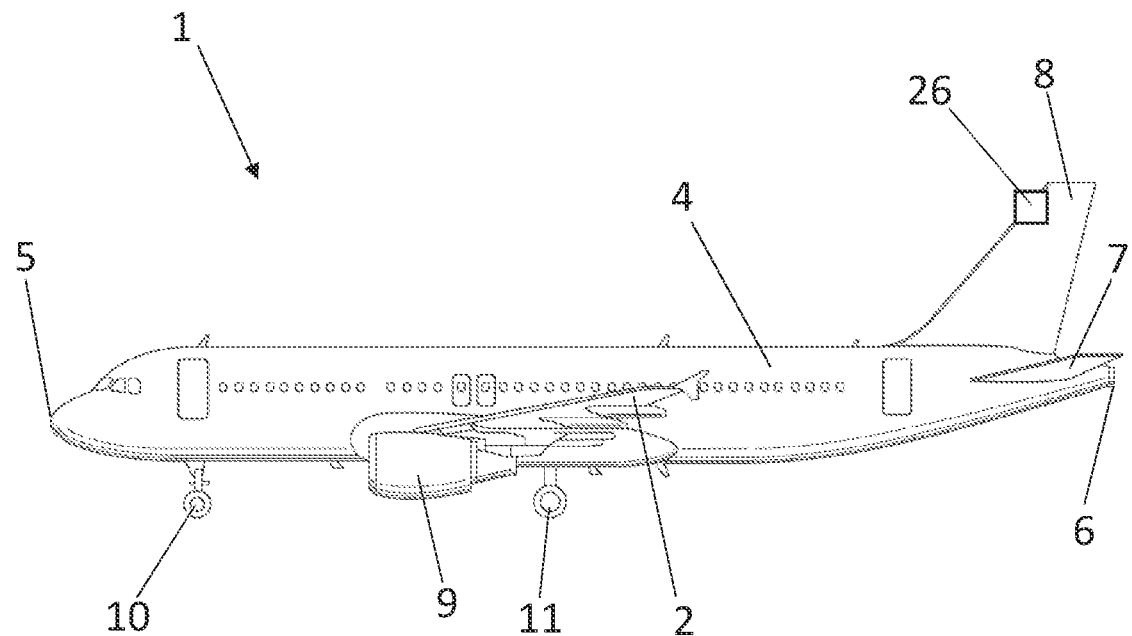
FIG. 1 shows a side view of an aircraft.
Figure 2:
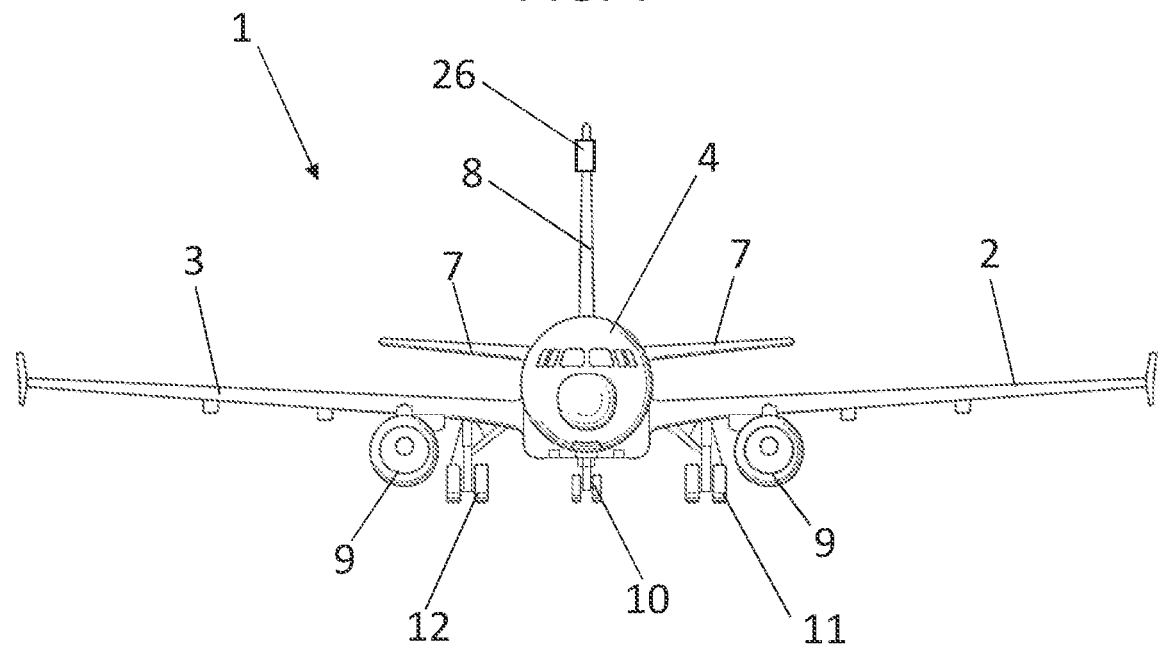
FIG. 2 shows a front view of the aircraft.

FIGS. 1 and 2 illustrate a fixed wing aircraft 1 with a port wing 2 and starboard wing 3 carrying wing mounted engines 9, the wings 2, 3 extending from a fuselage 4. The fuselage has a nose 5 and a tail 6 with horizontal and vertical stabiliser surfaces 7, 8 near the tail 6. The aircraft 1 is a typical jet passenger transport aircraft but the invention is applicable to a wide variety of aircraft types, including commercial, military, passenger, cargo, jet, propeller, general aviation, etc. with any number of engines attached to the wings or fuselage.

Each wing 2, 3 has a cantilevered structure with a length extending in a span-wise direction from a root to a tip, the root being joined to the aircraft fuselage 4.

The aircraft 1 has a set of landing gear 10, 11, 12 that support the aircraft 1 when it is on the ground and control the movement of the aircraft 1 during ground manoeuvres such as landing, taxiing and take-off. The landing gear 10, 11, 12 comprises a nose landing gear 10 generally aligned with a centre line of the aircraft 1, and port and starboard main landing gear 11, 12 that are positioned either side of the centre line of the aircraft 1. The nose landing gear 10 is positioned closer to the nose 5 of the aircraft 1 with respect to port and starboard landing gear 11, 12, and includes a pair of steering wheels that may be rotated by a steering actuator (not shown) to steer the aircraft 1. It will be clear that the invention is applicable to a wide variety of landing gear configurations, and in alternative examples the aircraft 1 may have any number of landing gear. The landing gear 10, 11, 12 may be retracted when the aircraft 1 is in flight and extended before landing.

The aircraft 1 may also include an imaging device 26, such as a camera, located on an external surface of the aircraft 1. The imaging device 26 may assist the pilot in manoeuvring the aircraft 1 as the imaging device 26 provides an alternative vantage point. The imaging device 26 may be positioned on the vertical stabiliser surface 8, as shown in FIGS. 1 and 2. Alternatively, or in addition, a similar imaging device may be placed on the horizontal stabiliser surface 7, the wings 2, 3, each landing gear 10, 11, 12, the fuselage 4 or any other part of the aircraft 1.

Figure 3:
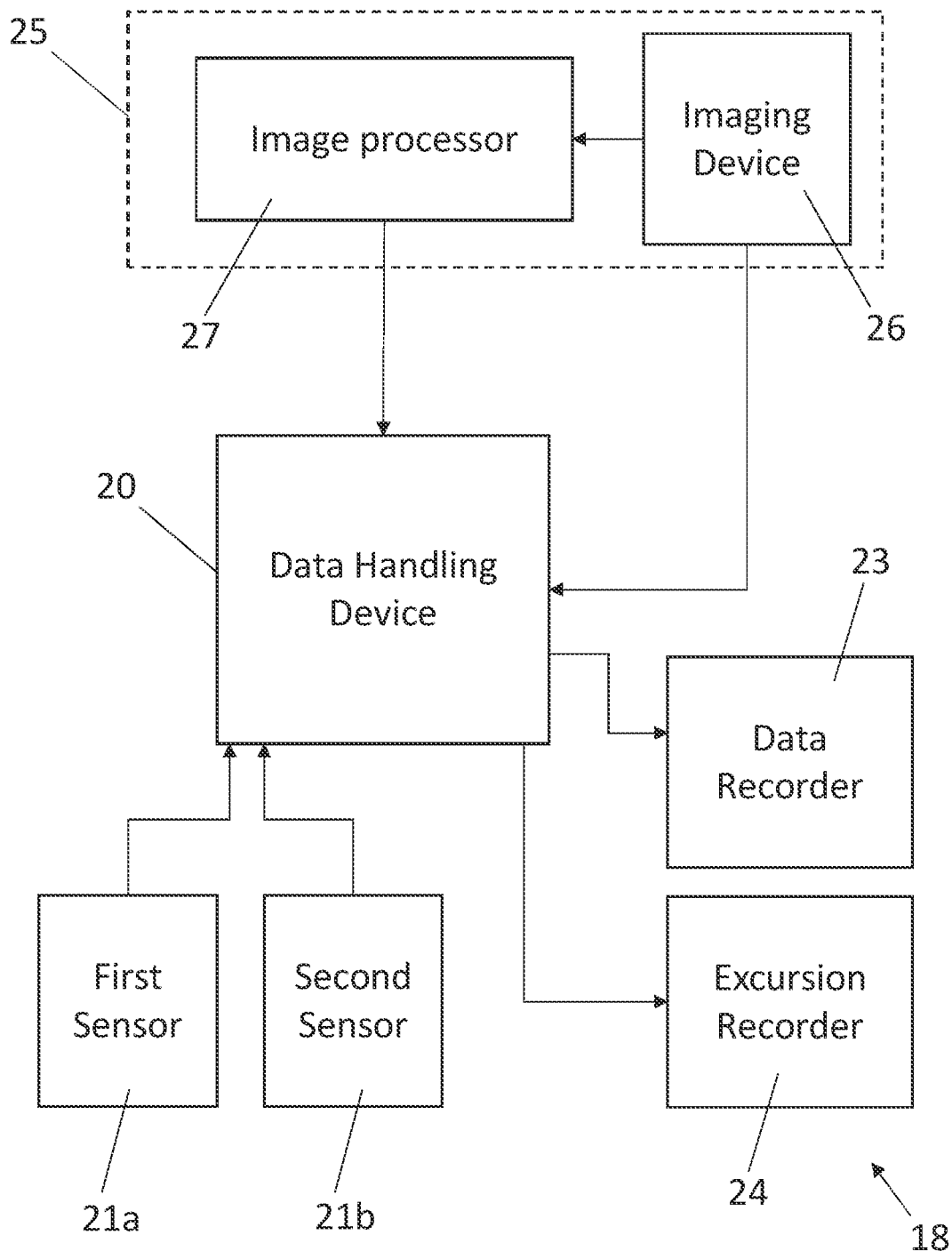
FIG. 3 shows apparatus for obtaining an excursion report for the aircraft.

The aircraft 1 comprises apparatus 18, shown in FIG. 3, for obtaining an excursion report. The apparatus 18 includes a vision system 25 including the image device 26; a data handling device 20, such as a computer; sensors 21a, 21b; and storage devices 23, 24.

The sensors 21a, 21b may be configured to measure parameters of the aircraft 1 and provide sensor data to the data handling device 20 to be time-stamped. Alternatively, the sensor data may be time-stamped by a device other than the data handling device 20, for example the sensors 21a, 21b themselves. Whilst FIG. 3 shows two sensors 21a, 21b, it will be clear that there may be any number of sensors, for example one, three, four, or more sensors.

The sensor data may include any data potentially relevant to determining the effects of an excursion, for example the acceleration of the aircraft 1, the speed of the aircraft 1, the heading (direction) of the aircraft 1, the location of the aircraft 1, the quantity of fuel of the aircraft 1, the mass of the aircraft 1, the distribution of the mass of the aircraft 1, one or more engine parameters, a wheel speed, a brake pressure, a wheel temperature, a brake temperature, the position of the centre of gravity of the aircraft 1, GPS coordinates of the aircraft, or any other suitable parameter of the aircraft 1.

The vision system 25 is configured to detect the aircraft 1 leaving the runway or taxiway 30. The vision system 25 includes the imaging device 26 that observes the aircraft 1. The imaging device 26 may observe the position of the aircraft 1 with respect to the position of the runway or taxiway 30. The vision system 25 also includes an image processor 27 that processes the data from the imaging device 26 in order for an excursion to be identified.

The data from the sensors 21a, 21b and/or the vision system 25 may be continuously stored in a data recorder 23. The data recorder 23 may be the Digital Flight Data Recorder (DFDR), i.e. "black box" recorder, or another storage device.

The image processor 27 may be configured to monitor the image data from the imaging device 26 to detect an excursion of the aircraft 1 from the runway or taxiway 30.

In a first example, the image processor 27 may be configured to monitor the image data from the imaging device 26 to detect the aircraft 1 leaving the runway or taxiway 30, and to detect the aircraft 1 returning to the runway or taxiway 30. In a second example, the image processor 27 may only detect the aircraft 1 leaving the runway or taxiway 30.

The data handling device 20 may be configured to record a time of the excursion. The time of the excursion may be the time of detection of the aircraft 1 leaving the runway or taxiway 30, and/or the time of detection of the aircraft 1 returning to the runway or taxiway 30. Alternatively the time of the excursion may be a mid-point between the time of leaving and the time of returning.

The data handling device 20 is configured to compile an excursion report. Thus the data recorder 23 contains data from the whole flight, but the excursion report only contains a subset of that data based on its time-stamp.

In a first embodiment, the excursion report comprises a subset of the time-stamped sensor data obtained from the sensors 21a, 21b and the imaging device 26 during a period around the time of the excursion, for example a first time period of predetermined duration before the time of the excursion, and/or a second time period of predetermined duration after the time of the excursion.

In one example of the first embodiment, the excursion report comprises: the time of the excursion (the time of the detection of the aircraft 1 leaving the runway or taxiway 30); a subset of the sensor data which was time-stamped during the excursion (i.e., during the second time period); and optionally also a subset of the sensor data which was time-stamped immediately before the excursion (i.e., during the first time period).

In another example of the first embodiment, the excursion report comprises: the time of the excursion (the time of the detection of the aircraft 1 returning to the runway or taxiway 30); a subset of the sensor data which was time-stamped during the excursion (i.e., during a first time period before the time of the detection of the aircraft 1 returning to the runway or taxiway 30); and optionally also a subset of the sensor data which was time-stamped immediately after the excursion (i.e., during a second time period after the time of the detection of the aircraft 1 returning to the runway or taxiway 30).

In a second embodiment, the excursion report comprises: a first subset of the time-stamped sensor data obtained from the sensors 21a, 21b and the imaging device 26 during an excursion period defined between the time of detection of the aircraft 1 leaving the runway or taxiway 30 and the time of detection of the aircraft 1 returning to the runway or taxiway 30.

In the second embodiment the excursion report comprises: the time of the excursion (i.e. the time of the detection of the aircraft 1 leaving the runway or taxiway 30 and/or the time of the detection of the aircraft 1 returning to the runway or taxiway 30); and a first subset of the sensor data which was time-stamped during the excursion (i.e., during the excursion period).

In the second embodiment, the excursion report may include additional data from the sensors 21a, 21b and the imaging device 26 which is time-stamped outside the excursion period. For example, the excursion report may comprise a second subset of the sensor data which was time-stamped during a first time period of predetermined duration before the excursion period; and/or a third subset of the sensor data which was time-stamped during a second time period of predetermined duration after the excursion period. In this way, the excursion report includes data slightly before and/or slightly after the excursion event which can help to understand any underlying issues, mitigate any inaccuracies in the detected time of the excursion, and assist in obtaining a more complete picture of the event.

The first time period of predetermined duration and the second time period of predetermined duration may be substantially equal in duration, or they may differ in duration.

The excursion report may be stored in an excursion recorder 24, as shown in FIG. 3, or it may be stored in the data recorder 23 or another suitable device. The excursion report may be transmitted to an airline, aircraft manufacturer, or other third party maintenance or operations provider.

The excursion report may be compiled after the sensor data has been obtained, stored in the data recorder 23, and time-stamped. For instance, the start and end times of the excursion period may be identified, and the time-stamped sensor data that occurs during the excursion period identified accordingly. This subset of sensor data may then be compiled into the excursion report.

Alternatively, the excursion report may be compiled in real-time. For example, the excursion report may start compiling when the image processor 25 detects that the aircraft 1 has left the runway or taxiway 30, and stop compiling when the aircraft 1 returns to the runway or taxiway 30, or shortly thereafter. The excursion report may include additional data, for example the excursion report may comprise airport mapping data (such as the position of the runway and/or taxiway as well as the dimensions of the runway and/or taxiway). The excursion report may comprise data from a satellite navigation system, for example GPS data. This additional data (e.g. airport mapping data or GPS data) may be used to compliment the sensor data to determine if an excursion has occurred, and/or to determine where the excursion occurred.

The imaging device 26 may be any suitable device capable of providing image data from which an excursion may be detected. The imaging device 26 may be a camera, such as a visible light camera, or an infrared camera. The imaging device 26 may be a light detection and ranging (LIDAR) system. There may be more than one imaging device 26, such that each imaging device 26 is suitable for monitoring a different part of the aircraft 1 and/or monitoring the aircraft 1 in different weather conditions. For example, a LIDAR system or infrared camera may accompany a visible light camera for use during low visibility conditions, such as snow and fog.

Figure 4:
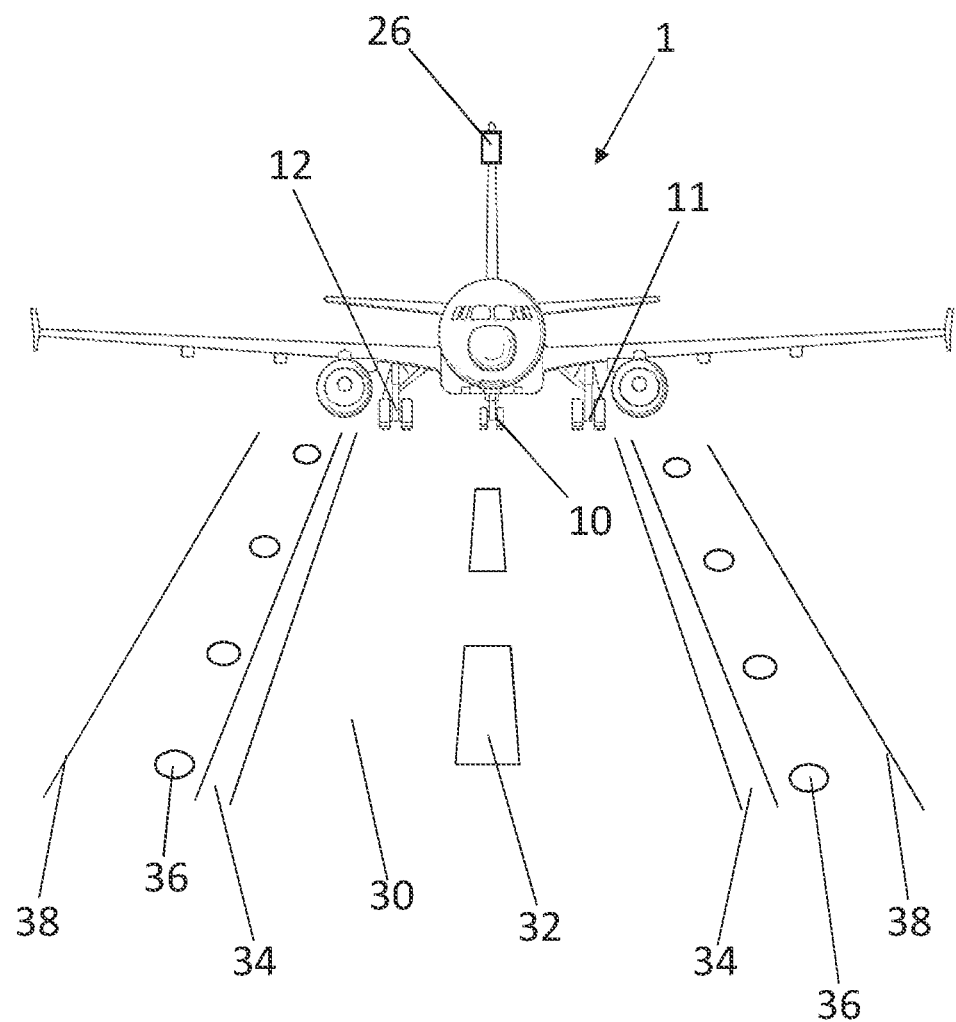
FIG. 4 shows the aircraft in a first position on a taxiway.
Figure 5:
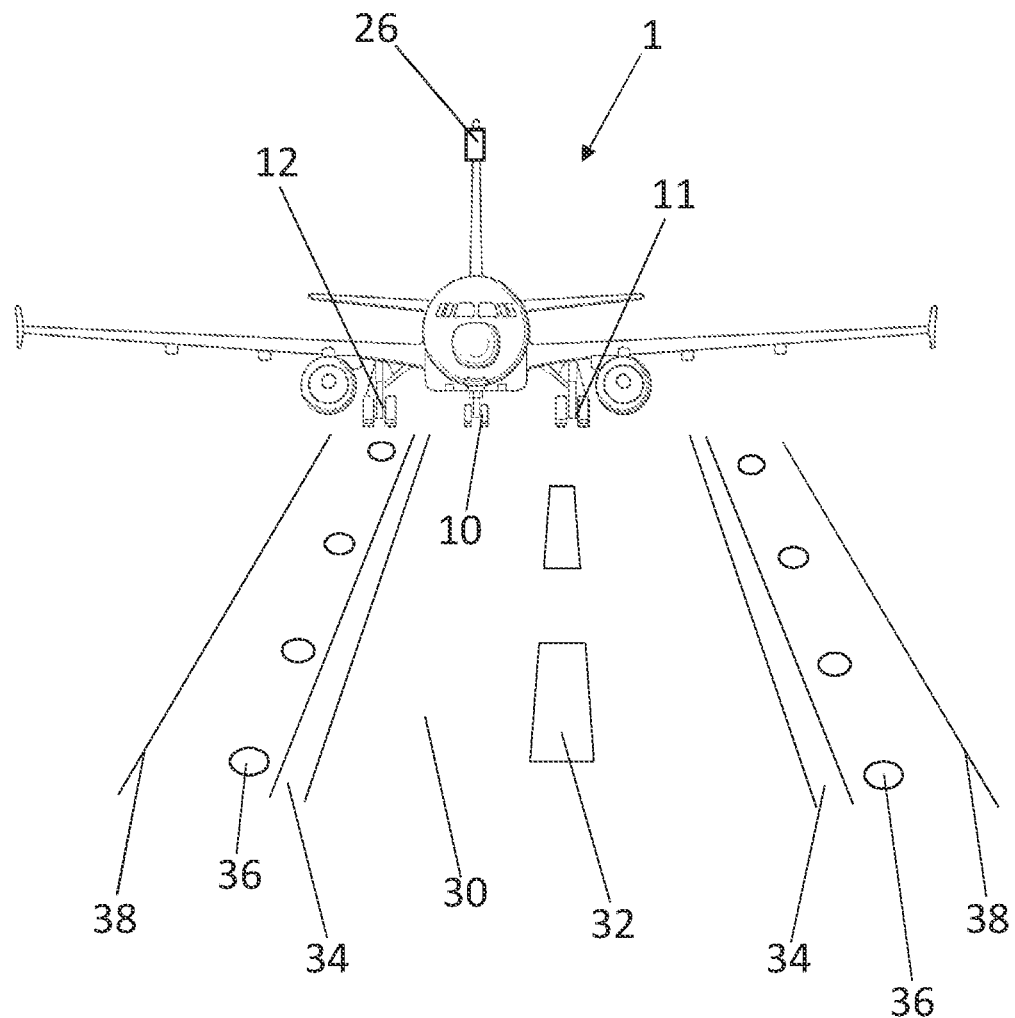
FIG. 5 shows the aircraft in a second position on a taxiway.
Figure 6:
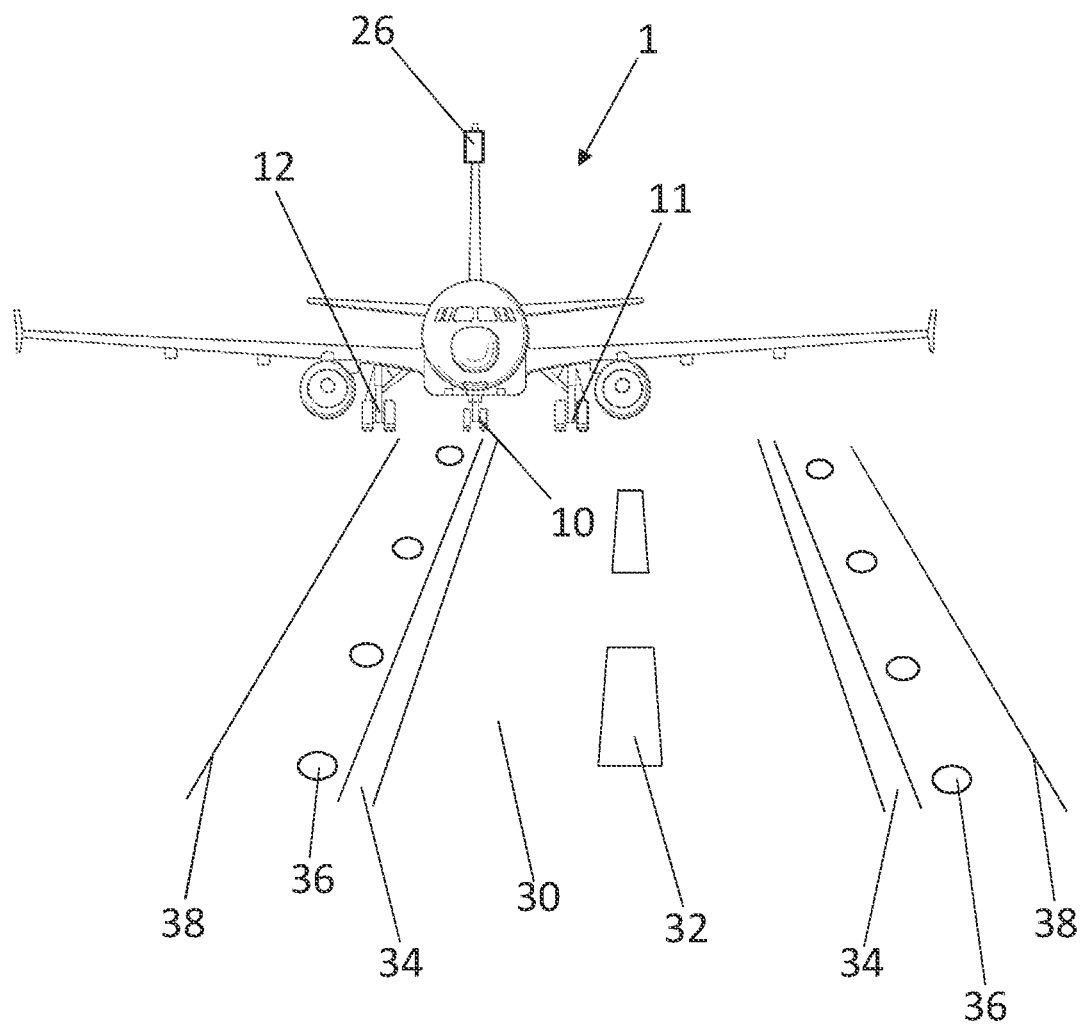
FIG. 6 shows the aircraft in a third position on a taxiway.

An excursion may be detected by detecting the aircraft 1 leaving and returning to the runway or taxiway 30 as shown in FIGS. 4-6.

FIG. 4 shows the aircraft 1 on a taxiway 30. The taxiway 30 may have a centre line 32. The taxiway 30 may comprise edge markings 34 that define nominal edges of the taxiway 30, edge lighting 36 that illuminates a path along the taxiway, and a tarmac edge 38 that defines the boundary of the tarmacked surface (e.g. the boundary with the tarmac and an adjacent grassed or unpaved area).

It will be understood that whilst FIG. 4 shows a taxiway 30, the aircraft 1 may alternatively be positioned on a runway. The runway may be substantially the same as the taxiway 30, e.g. having a centreline, edge markings, edge lighting, and a tarmac edge.

In the case of taxiways or runways, the shoulder between the edge markings 34 and the tarmac edge 38 normally follows a minimum width, but may in practice be wider. It may be the case that the shoulder is generally wider at some airports compared to others, or otherwise that the shoulder width varies in different places in an airport.

The image processor 27 may process the image data from the imaging device 26 to detect an edge of the taxiway 30 by detecting a feature of the taxiway 30 to determine the edge. The feature may be an edge marking 34 of the taxiway. The edge may be taken as the boundary of the edge marking 34 itself, or a predetermined shoulder distance from the edge marking 34. The edge of the taxiway 30 may be defined as being a set distance from the tarmac edge 38 towards a centre line 32 of the taxiway 30, or the edge of the taxiway may be defined as being a set distance away from a centre line 32 of the taxiway 30. Alternatively or in addition, the edge of the taxiway 30 may be determined from the edge lighting 36.

Further alternatively, the edge of the taxiway 30 may be determined by consulting a database of shoulder widths to determine the size of the tarmac shoulder between the edge marking 34 and the tarmac edge 38. The database may indicate a shoulder width for each airport an aircraft may visit, or may indicate a database of shoulder widths based on geographic areas which can be looked up with reference to the coordinates of the aircraft.

The vision system 25 of the aircraft 1 operates by obtaining image data from the imaging device 26 and processing the image data using the image processor 27 to detect an edge of the taxiway 30, and to detect if the aircraft 1 has left the taxiway 30.

An excursion may include only a portion of the aircraft 1 leaving and returning to the taxiway 30, or may require all of the aircraft 1 to leave and return to the taxiway 30. The portion of the aircraft 1 may be one or more of the landing gear 10, 11, 12, such that the vision system 25 detects the landing gear 10, 11, 12 leaving and returning to the taxiway 30.

In the example described below in relation to FIGS. 4 and 5, the vision system 25 is configured to detect an edge marking 34 of the taxiway 30 and to detect any of the landing gear 10, 11, 12 leaving the taxiway 30 and returning to the taxiway 30.

The aircraft 1 shown in FIG. 4 is centrally located on the taxiway 30, such that the nose landing gear 10 and the centre line of the aircraft 1 are aligned with the centre line of the taxiway 32 and the port and starboard main landing gear 11, 12 that are positioned either side of the centre line 32 of the taxiway 30. In this configuration, the landing gear 10, 11, 12 of the aircraft 1 are each within the edges of the taxiway 30, as the edge of the taxiway 30 is taken to be the edge marking 34 of the taxiway, such that there is no excursion of the aircraft 1 from the taxiway 30, and no excursion report is compiled. It will be appreciated that in other examples the edge of the taxiway 30 may be taken to be or based on any other feature of the taxiway 30.

FIG. 5 shows the aircraft 1 at a second position, where the starboard landing gear 12 is positioned outside of one of the edge markings 34, relative to the centre line 32 of the taxiway 30, such that the vision system 25 has detected the aircraft 1 leaving the taxiway 30, and a start time of the excursion period will have been determined based on the time of detection of the aircraft 1 leaving the taxiway 30.

Once the aircraft 1 returns to the taxiway 30, such that all of the landing gear 10, 11, 12 are within the edges of the taxiway 30, for example as shown in FIG. 4, an end time of the excursion period will be determined based on the time of detection of the aircraft 1 returning to the taxiway 30. The excursion report may then be compiled containing the data which was time-stamped during the excursion period.

In an alternative example, in which the edge of the taxiway 30 is taken to be the tarmac edge 38 of the taxiway 30, the vision system 25 will not register the aircraft 1 position shown in FIG. 5 as an excursion, as none of the landing gear 10, 11, 12 have crossed the edge of the taxiway 30 as defined by the tarmac edge 38.

FIG. 6 shows the aircraft 1 in a third position in which the starboard landing gear 12 is positioned outside both the edge markings 34 and the tarmac edge 38, relative to the centre line 32 of the taxiway 30. In this case, the vision system 25 detects that the aircraft 1 has left the taxiway 30 whether the edge of the taxiway 30 is taken to be the edge marking 34 or the tarmac edge 38.

An excursion may be determined based on when a landing gear 10, 11, 12 leaves the runway or taxiway 30. Alternatively, an excursion may be determined based on any other parameter, such as when part of a landing gear 10, 11, 12 leaves the runway or taxiway 30, or when more than one landing gear 10, 11, 12 leaves the runway or taxiway 30, or when a particular landing gear 10, 11, 12 leaves the runway or taxiway 30, or when the centre line of the aircraft 1 deviates a predetermined distance from the centre line 32 of the runway or taxiway 30.

An excursion period may start when a first landing gear 10, 11, 12 leaves the runway or taxiway 30, and end when all landing gear 10, 11, 12 return to the runway or taxiway 30.

Additional imaging devices 26 may be positioned in other positions on the aircraft 1 to assist in detecting an excursion, for example an imaging device 26 may be positioned to observe each of the landing gear 10, 11, 12.

The imaging device 26 (or imaging devices 26) may be positioned sub-optimally for detecting an excursion of the aircraft 1, for example to give maximum visibility of the aircraft 1 and runway or taxiway 30 to the pilot or passengers, or with other considerations or functions in mind. In some cases, the view of the imaging device 26 to one of the landing gear 10, 11, 12, and the runway or taxiway 30 beneath the landing gear 10, 11, 12, may be obstructed by one of the wings 2, 3 or the fuselage 4.

If the view of the imaging device 26 is obstructed, or otherwise insufficient, the image processor 27 may determine if an excursion occurs by extrapolating the position of parts of the aircraft 1 and parts of the runway or taxiway 30 from the image data. For example the position of one or more of the landing gear 10, 11, 12 may be extrapolated from the image data based on a known or predicted distance between visible and non-visible features of the aircraft 1, and the position of one or more of the features of the runway or taxiway 30 may be extrapolated based on a known or predicted distance between visible and non-visible features of the runway or taxiway 30.

An alert may be generated in response to the detection of the aircraft 1 leaving the runway or taxiway 30. For example, an alert may be sent to the pilot, airline, aircraft manufacturer, or other third party maintenance or operations provider. The alert may be automatically sent by the data handling device 20. This allows the excursion to be notified to the pilot, airline, aircraft manufacturer, or other third party, allowing appropriate steps to be taken to mitigate continued excursion or to assess the effects of the excursion before continued operation of the aircraft 1.

The excursion report may be analysed to determine a severity level of an excursion of the aircraft 1. The severity level may be compared to a predetermined severity threshold. The excursion report may be compiled in response to the severity level exceeding the predetermined severity threshold. This allows minor excursions to be assessed internally by the excursion apparatus and to be deemed as not requiring further investigation or deemed as minor such that the level of inspection can be tailored accordingly, for example a visual inspection only. This reduces unnecessary labour checking minor excursions where no damage has occurred, and reduces the need for extensive inoperable periods for the aircraft 1 whilst these checks would otherwise be undertaken.

All elements of the apparatus 18 of FIG. 3 may be carried by the aircraft 1, particularly when the excursion report is compiled in real-time. Elements carried by the aircraft 1 typically include the imaging device 26 and image processor 27 of the vision system 25; and the sensors 21a, 21b (which may be accelerometers etc.). Other functions of the apparatus of FIG. 3 may be carried out by computers or storage devices which are remote from the aircraft 1, particularly when the excursion report is compiled after the end time of the excursion period. For instance, the start time of the excursion period, the end time of the excursion period and time-stamped sensor data for the entire flight may be transmitted to a remote processor which compiles the excursion report by identifying the relevant subset of the sensor data based on its time-stamps.

Where the word 'or' appears this is to be construed to mean 'and/or' such that items referred to are not necessarily mutually exclusive and may be used in any appropriate combination.

Although the invention has been described above with reference to one or more preferred embodiments, it will be appreciated that various changes or modifications may be made without departing from the scope of the invention as defined in the appended claims.

The invention claimed is:

1. A computer-implemented method of obtaining an excursion report for an aircraft, the aircraft on a runway or taxiway comprising a landing gear, one or more sensors and a vision system, the method comprising:
   obtaining sensor data from the one or more sensors;
   storing and time-stamping the sensor data;
   operating the vision system and detecting an excursion of the aircraft from the runway or taxiway, wherein operating the vision system to detect the excursion comprises detecting the landing gear leaving the runway or taxiway;
   recording a time of the excursion; and
   compiling an excursion report,
   the excursion report comprising: the time of the excursion, and a subset of the sensor data which was time-stamped during the excursion.

2. The method of claim 1, wherein operating the vision system to detect the excursion of the aircraft comprises operating the vision system to detect the aircraft returning to the runway or taxiway.

3. The method of claim 2,
   recording a start time of an excursion period based on a time of detection of the aircraft leaving the runway or taxiway;
   recording an end time of the excursion period based on a time of detection of the aircraft returning to the runway or taxiway; and
   wherein the excursion report further comprises the start time of the excursion period, the end time of the excursion period and a subset of the sensor data which was time-stamped during the excursion period.

4. The method of claim 3, wherein the excursion report further comprises: a second subset of the sensor data which was time-stamped during a first time period before the excursion period.

5. The method of claim 3, wherein further comprising: obtaining image data from the vision system; and storing and time-stamping the image data, wherein the excursion report further comprises a subset of the image data which was time-stamped during the excursion or during the excursion period.

6. The method of claim 3, wherein operating the vision system comprises: obtaining image data; processing the image data to detect an edge of the runway or taxiway by detecting one or more of: edge markings of the runway or taxiway; edge lighting of the runway or taxiway; and a centreline of the runway or taxiway.

7. The method of claim 3, wherein the sensor data is indicative of: acceleration of the aircraft, speed of the aircraft, a heading of the aircraft, a location of the aircraft, a quantity of fuel of the aircraft, a mass of the aircraft, a distribution of the mass of the aircraft, one or more engine parameters, a wheel speed, a brake pressure, and/or a centre of gravity of the aircraft.

8. The method of claim 3, further comprising analysing the excursion report to determine a severity level of an excursion of the aircraft, and comparing the severity level to a predetermined severity threshold; wherein the excursion report is compiled in response to the severity level exceeding the predetermined severity threshold.

9. The method of claim 1, wherein the time of the excursion comprises a time of detection of the aircraft leaving the runway or taxiway.

10. The method of claim 1, wherein the excursion report is compiled after the sensor data has been obtained, stored and time-stamped; and compiling the excursion report comprises identifying the subset of the sensor data based on its time-stamps.

11. The method of claim 1, further comprising: obtaining image data from the vision system; and storing and time-stamping the image data, wherein the excursion report further comprises a subset of the image data which was time-stamped during the excursion or during the excursion period.

12. The method of claim 1, wherein operating the vision system comprises: obtaining image data; processing the image data to detect an edge of the runway or taxiway by detecting one or more of: edge markings of the runway or taxiway; edge lighting of the runway or taxiway; and a centreline of the runway or taxiway.

13. The method of claim 1, wherein the sensor data is indicative of: acceleration of the aircraft, speed of the aircraft, a heading of the aircraft, a location of the aircraft, a quantity of fuel of the aircraft, a mass of the aircraft, a distribution of the mass of the aircraft, one or more engine parameters, a wheel speed, a brake pressure, and/or a centre of gravity of the aircraft.

14. The method of claim 1, further comprising analysing the excursion report to determine a severity level of an excursion of the aircraft, and comparing the severity level to a predetermined severity threshold; wherein the excursion report is compiled in response to the severity level exceeding the predetermined severity threshold.

15. The method of claim 1, wherein the vision system comprises one or more imaging devices selected from: a visible light camera, an infrared camera, and a light detection and ranging system (LIDAR).

16. The method of claim 1, further comprising generating an alert signal in response to the detection of the aircraft leaving the runway or taxiway.

17. An apparatus for obtaining an excursion report for an aircraft, the aircraft comprising one or more sensors and a vision system, wherein the apparatus is configured to perform the method of claim 1.

18. An aircraft comprising: one or more sensors; a vision system; and the apparatus of claim 17.

\* \* \* \* \*